I. A. DEWAR, D. S. SMITH, AND R. A BRASHEAR, OF FRANKLIN, PENNSYLVANIA.

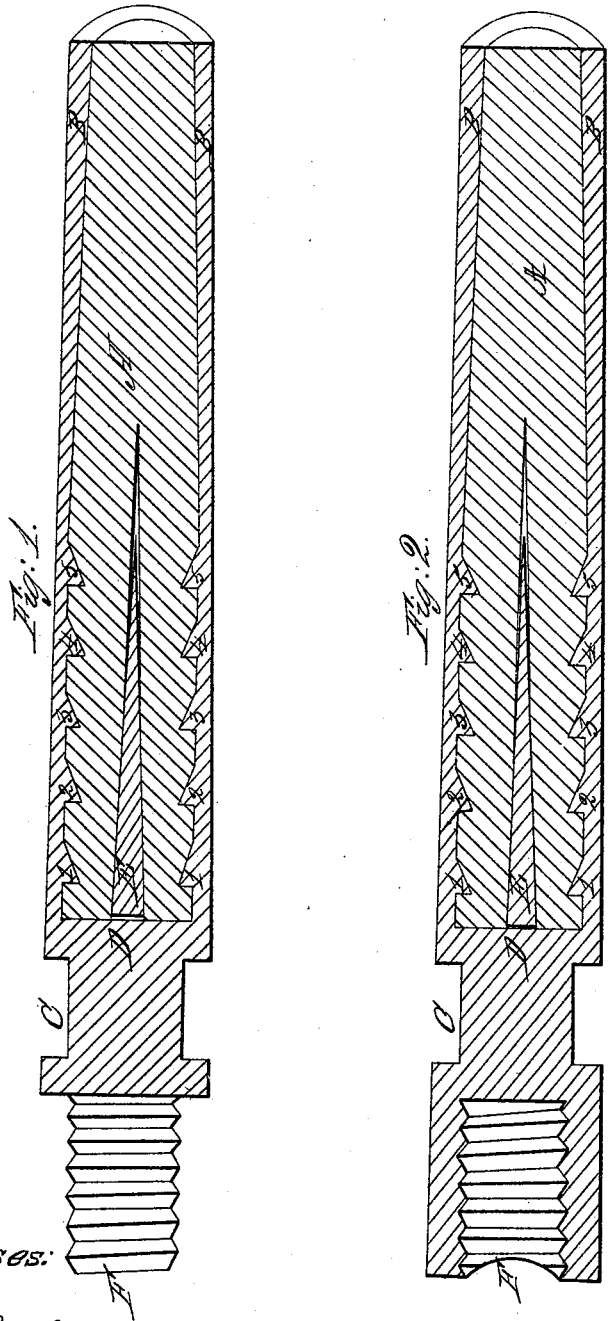

Letters Patent No. 90,935, dated June 8, 1869.

IMPROVED COUPLING FOR PUMP-RODS.

The Schedule referred to in these Letters Patent and making part of the same.

*To all whom it may concern:*

Be it known that we, I. A. DEWAR, D. S. SMITH, and R. A. BRASHEAR, of the city of Franklin, in the county of Venango, State of Pennsylvania, have invented a new and improved Mode of Coupling the Sucker-Rods for Pumps in oil and salt-wells; and we do hereby declare that the following is a full and exact description of the same, reference being had to the accompanying drawings, and the letters of reference marked thereon.

Figure 1 and Figure 2 represent our coupling when the same is "uncoupled." They are sectional views, showing the inside construction.

Fig. 1 represents the "male" coupling, and is constructed of a socket of iron, or other metal, with a screw at F, a square "wrench-seat" at C, to hold the same, with a wrench when coupling.

The inside of the socket is of larger diameter at the end D than B B, and is constructed with corrugations or teeth 1, 2, 3, 4, 5, on the inner surface thereof.

E is the wedge of wood or metal inserted into the end of the pump-rod A. The rod is then driven into the socket B B, and when the wedge E comes in contact with D, the wedge is driven into the rod A, which is separated and forced into the corrugations 1, 2, 3, 4, 5, thereby holding the rod securely in the socket.

Fig. 2 is the female coupling, and is constructed like fig. 1 in every respect, other than it is the female screw, while fig. 1 is the male.

What we claim as our invention, and desire to secure by Letters Patent of the United States, is—

The rod A, socket B B, corrugations 1, 2, 3, 4, 5, and the wedge E, when constructed as described for the purposes set forth.

I. W. DEWAR.
D. S. SMITH.
R. A. BRASHEAR.

Witnesses:
A. B. RICHMOND,
ROE REISINGER.